United States Patent
Hauenstein

(10) Patent No.: US 11,732,466 B2
(45) Date of Patent: Aug. 22, 2023

(54) MULTIPLE LAYERED RADIANT ACTIVE ASSEMBLY

(71) Applicant: Mark Hauenstein, Reno, NV (US)

(72) Inventor: Mark Hauenstein, Reno, NV (US)

(73) Assignee: Mark Hauenstein, Reno, NV (US)

( * ) Notice: Subject to any disclaimer, the term of this patent is extended or adjusted under 35 U.S.C. 154(b) by 0 days.

(21) Appl. No.: 15/854,874

(22) Filed: Dec. 27, 2017

(65) Prior Publication Data
US 2018/0119415 A1  May 3, 2018

Related U.S. Application Data

(63) Continuation of application No. 14/099,974, filed on Dec. 8, 2013, now Pat. No. 9,885,173.

(60) Provisional application No. 61/747,709, filed on Dec. 31, 2012.

(51) Int. Cl.
| | |
|---|---|
| *E04B 1/74* | (2006.01) |
| *F24F 5/00* | (2006.01) |
| *E04B 1/76* | (2006.01) |
| *F24S 20/66* | (2018.01) |

(52) U.S. Cl.
CPC ............. *E04B 1/74* (2013.01); *F24F 5/0075* (2013.01); *E04B 2001/7691* (2013.01); *F24S 20/66* (2018.05); *Y02B 10/20* (2013.01)

(58) Field of Classification Search
CPC .................................. F24F 7/02; F24F 5/0075
See application file for complete search history.

(56) References Cited

U.S. PATENT DOCUMENTS

| 232,883 A | 10/1880 | Carey, Jr. | |
|---|---|---|---|
| 3,176,116 A * | 3/1965 | Lighter | E01C 11/265 |
| | | | 165/49 |
| RE29,924 E * | 3/1979 | Becker | E04B 1/7092 |
| | | | 165/49 |

(Continued)

FOREIGN PATENT DOCUMENTS

DE  33 35 191 A1  3/1984

OTHER PUBLICATIONS

Federal Research and Development Agenda for Net-Zero Energy, High Performance Green Buildings by National Science and Technology Council, Committee on Technology, Oct. 2008, Chapters 1 and 2.

(Continued)

*Primary Examiner* — Devon Russell
(74) *Attorney, Agent, or Firm* — Daly, Crowley, Mofford & Durkee LLP

(57) ABSTRACT

An active insulated assembly for controlling heat transfer through insulated assemblies. The active insulated assembly includes a thermal conductor configured to actively move thermal energy from the active insulated assembly. The active insulated assembly also includes a first radiant barrier on a first side of the thermal conductor configured to reflect radiant energy back to its source and allow the assembly to resist heat transfer in either direction. The active insulated assembly further includes a second radiant barrier on a second side of the thermal conductor wherein the second side is opposite the first side, the second radiant barrier configured to reflect radiant energy back to its source and allow the assembly to resist heat transfer in either direction.

18 Claims, 5 Drawing Sheets

(56) References Cited

U.S. PATENT DOCUMENTS

| | | | | |
|---|---|---|---|---|
| 4,290,247 A | * | 9/1981 | Alderman | E04D 13/17 165/53 |
| 4,398,529 A | * | 8/1983 | Schoenfelder | F24D 17/0068 126/620 |
| 5,931,381 A | * | 8/1999 | Fiedrich | F24D 3/14 237/69 |
| 6,182,903 B1 | | 2/2001 | Fiedrich | |
| 6,811,852 B2 | * | 11/2004 | Alderman | E04B 9/045 428/69 |
| 7,556,491 B2 | * | 7/2009 | Blankenship | F26B 23/10 264/320 |
| 7,818,922 B2 | * | 10/2010 | Ellis | E04D 13/1618 428/158 |
| 8,100,341 B1 | * | 1/2012 | Roderick | F24F 5/0075 236/49.3 |
| 8,156,703 B2 | * | 4/2012 | Alderman | B32B 3/08 52/309.13 |
| 8,245,947 B2 | * | 8/2012 | Roderick | F24F 11/0001 236/49.3 |
| 8,365,498 B2 | * | 2/2013 | Hurlburt | B32B 3/12 428/703 |
| 8,528,284 B2 | * | 9/2013 | Aspenson | E04B 1/74 52/302.3 |
| 8,615,945 B2 | * | 12/2013 | Walker | E04C 2/34 428/105 |
| 9,052,428 B2 | * | 6/2015 | Cameron | H05K 7/20427 |
| 9,228,356 B2 | * | 1/2016 | Edwards | E04D 1/24 |
| 9,885,173 B2 | | 2/2018 | Hauenstein | |
| 2003/0126806 A1 | * | 7/2003 | Ellis | E04B 7/20 52/95 |
| 2004/0000113 A1 | * | 1/2004 | Alderman | B32B 5/02 52/407.5 |
| 2004/0206479 A1 | | 10/2004 | Kroliczek et al. | |
| 2006/0230707 A1 | * | 10/2006 | Roe | E04D 13/172 52/794.1 |
| 2006/0231562 A1 | * | 10/2006 | Carroll | B65D 81/3879 220/737 |
| 2007/0094967 A1 | * | 5/2007 | Kosny | E04B 1/14 52/309.9 |
| 2008/0048101 A1 | * | 2/2008 | Romig | B60J 3/04 250/221 |
| 2009/0279303 A1 | * | 11/2009 | Keen | A01G 9/26 362/285 |
| 2009/0314463 A1 | * | 12/2009 | Frobosilo | B32B 3/266 165/49 |
| 2012/0186184 A1 | * | 7/2012 | Mencio | E04B 7/20 52/588.1 |
| 2012/0255707 A1 | * | 10/2012 | Li | B32B 5/02 165/56 |
| 2015/0202892 A1 | * | 7/2015 | Jessen | B41J 11/002 34/245 |

OTHER PUBLICATIONS

U.S. Non-Final Office Action dated Jul. 19, 2016 for U.S. Appl. No. 14/099,974; 11 Pages.
Response to U.S. Non-Final Office Action dated Jul. 19, 2016 for U.S. Appl. No. 14/099,974; Response filed Jan. 14, 2017; 11 Pages.
U.S. Final Office Action dated May 15, 2017 for U.S. Appl. No. 14/099,974; 12 Pages.
Response to U.S. Final Office Action dated May 15, 2017 for U.S. Appl. No. 14/099,974; Response and After Final Consideration Program Request filed Aug. 11, 2017; 11 Pages.
U.S. Notice of Allowance dated Sep. 27, 2017 for U.S. Appl. No. 14/099,974; 6 Pages.

* cited by examiner

US PAT. #5,931,381
(Prior Art)

US PAT. #2006/0230707
(Prior Art)

US PAT. #6,811,852
(Prior Art)

MULTIPLE LAYERED RADIANT ACTIVE ASSEMBLY

RELATED APPLICATION(S)

This application is a continuation of U.S. application Ser. No. 14/099,974, filed Dec. 8, 2013, which claims the benefit of and priority to U.S. Provisional Patent Application Ser. No. 61/747,709, filed on Dec. 31, 2012. The entire teachings of the above applications are incorporated herein by reference.

BACKGROUND OF THE INVENTION

This invention relates to multiple improvements to the performance of insulated assemblies for all matters of use, including walls, floors, roofs of dwellings and buildings and any enclosure designed to create a controlled thermal environment.

In the 2008 National Science and Technology report on "Net Zero Energy, High Performance Green Buildings", "the greenest energy is that which is not used." The report goes on to state that new construction techniques and methods must be employed to breach the current best energy efficiency standards for fully integrated designed structures. Deconstructing the current state of the art for building elements and looking for new materials and methods is an understood way to make a quantum leap in more energy efficient structures. Building codes incorporate climate data (zones) and insulation R values as a means to establish minimum building performance as a prescriptive method of designing structures. In more severe climates, walls are constructed with fiber glass batts or blown insulation, and the thickness of the needed insulation dictates the wall thickness. In addition, these insulations tend to settle over time, leaving un-insulated gaps and reducing their originally intended effectiveness. Insulation products are available that include some form of a radiant barrier, but it is always a single radiant barrier and little is given in the specifications of the product on how the radiant layer operates or how it should be properly applied in construction methods.

Typical insulated assembly construction uses an insulation material to resist the transfer of heat to reduce the energy required to heat or cool the controlled thermal environment. Although heat transfer can occur in all three forms: 1) conductive, 2) convective, and 3) radiation; traditional insulated assemblies are tested and measured in terms of overall R value ($U_{total}=1/R_{total}$), where U value–overall heat transfer coefficient and R value–the resistive property of an insulation material, and overlook the effects of radiant heat transfer through the assembly. As industries are challenged to maintain higher of levels of energy efficiency, new methods need to be developed to adequately address all three forms of heat transfer.

Radiant heating as a technology is typically defined as a method of intentionally using the principles of radiant heat transfer to warm an object radiantly from an emitting heat source. Most prior art in the area of radiant heating define a heating source and radiant surface to initiate heat transfer. As stated in U.S. Pat. No. 5,931,381, entitled "FOR RADIANT FLOOR, WALL AND CEILING HYDRONIC HEATING AND/OR COOLING SYSTEMS USING METAL PLATES THAT ARE HEATED OR COOLED BY ATTACHED TUBING THAT IS FED HOT OR COLD WATER, TECHNIQUES OF IMPROVING PERFORMANCE AND AVOIDING CONDENSATION WHEN COOLING", issued Aug. 3, 1999, "It is believed by many that hydronic radiant heating is the ideal way to warm the human body and superior to forced hot air heating." Much of the prior art is typical of FIG. 1 and is focused on claims using a heated or cooled plate or panel to improve the occupant comfort by using radiant heating methods. Further, U.S. Patent 2011/0232883, "IN-WALL HYDRONIC THERMAL CONTROL SYSTEM AND INSTALLATION METHOD", published Sep. 29, 2011, U.S. Pat. No. 6,182,903, "RADIANT FLOOR WALL AND CEILING HYDRONIC HEATING AND/OR COOLING SYSTEMS, USING MODULAR PANELS HINGED TOGETHER IN SETS OF PANELS, STAGGERING THE POSITIONS OF PANELS IN THE SETS SO THAT SETS ARE INTERLOCKING", issued Feb. 6, 2001 both represent past works that claimed to use a heat TRANSFER METHOD (MEDIUM) 102 and a reflective element 101, to direct radiant heat to the conditioned space.

Further, a single layer of heated radiant material will radiate from both surfaces and the radiant heat loss from the side of the barrier that is directed away from the conditioned space is omitted and un-accounted for in the heating calculations and thermal performance.

Prior art with respect to insulated assemblies has incorporated some form of a radiant barrier but have not used any active forms or methods to affect the insulated assembly's performance. U.S. patent 2006/0230707, "VENTED INSULATION PANEL WITH REFLECTING SURFACE" issued Oct. 19, 2006, states "In more recent years, many products have been introduced that utilize the special properties of aluminum. Highly polished aluminum foil or aluminum sheets, have the unique property of reflecting up to ninety-seven-percent (97%) of the incoming radiant energy." As a related patent in FIG. 2, it includes a radiant layer 201 and an air gap 202 that by nature can create convective heat transfer, but this prior art does not treat radiant energy at both assembly surfaces; nor does it use a truly active method to reduce the heat transfer effect. Passive insulation methods 203 are used to limit heat transfer to the conditioned space.

U.S. Pat. No. 6,811,852, "REFLECTIVE HEAT INSULATION", issued Nov. 2, 2004 (FIG. 3) features an insulated assembly that provides a radiant layer 301 at both exposed surfaces of the assembly, but provides only a pocket of dead air space 302 between the two radiant layers. This prior art lacks any active method to reduce the heat transfer effect.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an active insulated assembly for controlling heat transfer through insulated assemblies. The active insulated assembly includes a thermal conductor configured to actively move thermal energy from the active insulated assembly. The active insulated assembly also includes a first radiant barrier on a first side of the thermal conductor configured to reflect radiant energy back to its source and allow the assembly to resist heat transfer in either direction. The active insulated assembly further includes a second radiant barrier on a second side of the thermal conductor wherein the second side is opposite the first side, the second radiant barrier configured to reflect radiant energy back to its source and allow the assembly to resist heat transfer in either direction.

Another example embodiment includes an active insulated assembly for controlling heat transfer through insulated assemblies. The active insulated assembly includes a thermal conductor configured to actively move thermal energy from the active insulated assembly. The active insulated assembly also includes a first radiant barrier on a first side of the thermal conductor configured to reflect radiant energy back to its source and allow the assembly to resist heat transfer in either direction. The active insulated assembly further includes a second radiant barrier on a second side of the thermal conductor wherein the second side is opposite the first side, the second radiant barrier configured to reflect radiant energy back to its source and allow the assembly to resist heat transfer in either direction. The active insulated assembly additionally includes a logic device configured to control the movement of thermal energy in the thermal conductor.

Another example embodiment includes an active insulated assembly for controlling heat transfer through insulated assemblies. The active insulated assembly includes a first radiant barrier configured to reflect radiant energy back to its source and allow the assembly to resist heat transfer in either direction. The active insulated assembly also includes a thermal conductor on a first side of the first radiant barrier configured to actively move thermal energy from the active insulated assembly. The active insulated assembly further includes a second radiant barrier on a first side of the thermal conductor wherein the second radiant barrier is opposite the first radiant barrier relative to the thermal conductor. The second radiant barrier is configured to reflect radiant energy back to its source and allow the assembly to resist heat transfer in either direction. The active insulated assembly additionally includes a logic device configured to control the movement of thermal energy in the thermal conductor. The active insulated assembly moreover includes an insulating material placed between the first radiant barrier and the second radiant barrier. The active insulated assembly also includes a sensor configured to measure the non-radiant heat transfer at the first radiant barrier.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

This invention and its various embodiments use specific assembly layers to reflect or re-direct radiant energy and isolate all heat transfer between the two radiant layers to a conductive or convective form and using various active methods to remove or add energy content to restrict heat transfer through the assembly, subassembly, or component. The process and method of applying energy, redirecting radiant energy in an effort to create net neutral heat transfer assembly.

It is an object of the present invention to control and reduce the transfer of heat through an assembly by first controlling the heat transfer caused by radiant heat and then by using a thermally conductive material sandwiched between the two exposed surfaces to actively impede heat transfer through the assembly. In describing thermally conductive, in this art, the reference is the ability of a material to transfer heat, not electrical conduction.

Active Insulated Assembly

Figure 1:
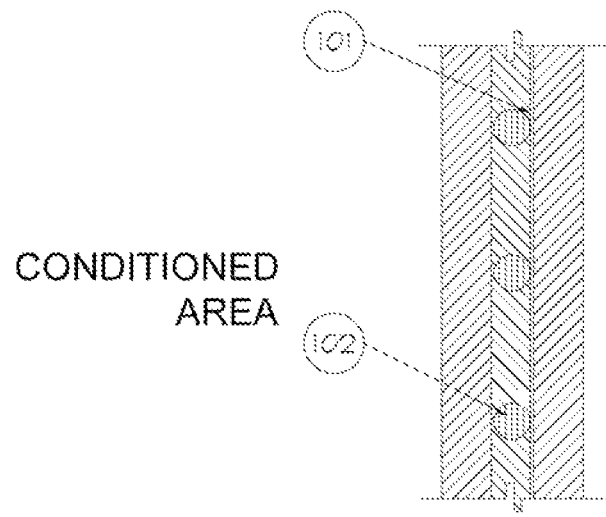
FIG. 1 (Prior Art) is a section view of U.S. Pat. No. 5,931,381, referenced above.
Figure 2:
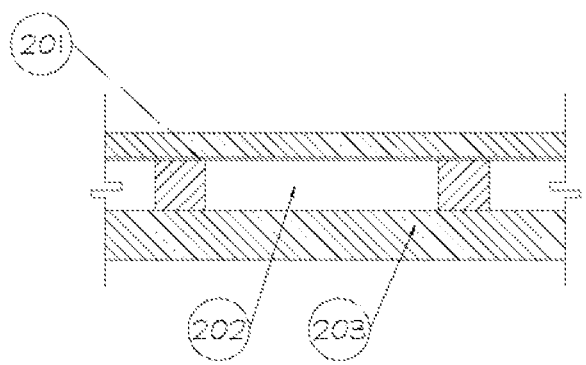
FIG. 2 (Prior Art) is a section view of U.S. Patent Publication No. 2006/0230707, referenced above.
Figure 3:
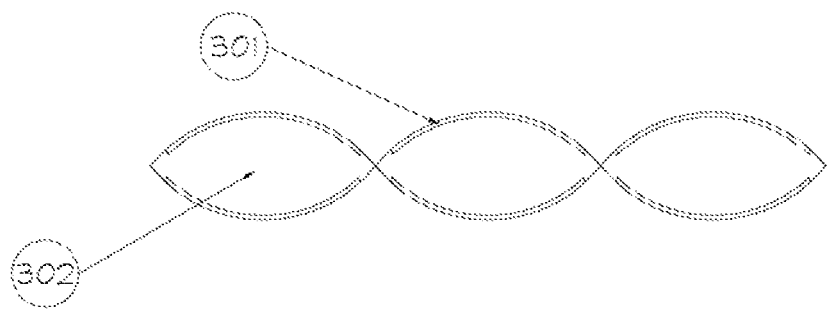
FIG. 3 (Prior Art) is a section view of U.S. Pat. No. 6,811,852, referenced above.
Figure 4:
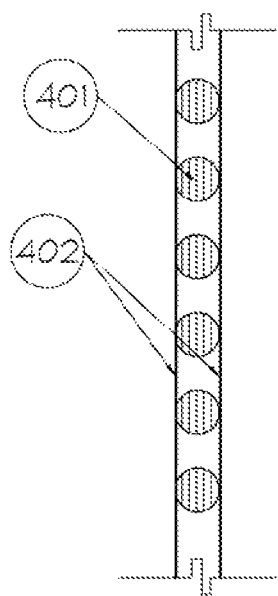
FIG. 4 illustrates an example of an active insulated assembly.

FIG. 4 illustrates an example of an active insulated assembly 400. The active insulated assembly 400 provides a novel approach to controlling the radiation component of heat transfer and active energy means to improve an insulated assembly's performance. In particular, the active insulated assembly 400 provides a comprehensive approach to controlling heat transfer through insulated assemblies by addressing the (1) radiant heat transfer component in an insulated assembly and (2) applying active methods within the assembly to inhibit heat transfer. I.e., by removing (or adding) heat to the insulated assembly, a conditioned area is easier to maintain at its current environment than would otherwise be possible. That is, the active insulated assembly 400 uses various methods, including those that actively add or remove energy from the insulated assembly, to neutralize any net heat transfer. Moreover, the active insulated assembly 400 accounts for all radiant energy transfer through an insulated assembly to improve the overall energy performance as it pertains to maintaining the conditioned system.

One of skill in the art will appreciate that the active insulated assembly 400 can produce multiple benefits. For example, the active insulated assembly 400 can save energy by taking into account the radiant losses and/or radiant heat transferred that has been previously overlooked. In addition, the active insulated assembly 400 can save energy by reducing the heat transfer through the assembly, thereby reducing the overall heating and cooling costs to maintain the interior environment conditions. Further, the active insulated assembly 400 can use various methods to convert previously lost heat transfer into usable forms of energy. Moreover, once heat transfer is converted into a usable form of energy, it can be stored or transferred to be used in other parts of the active insulated assembly 400 or within a structure. E.g., heat that is removed from the active insulated assembly 400 can be transported to heat desired areas of a structure or an area of the structure that is producing excess heat can be used to heat the active insulated assembly 400. Also, the symmetrical assembly design of active insulated assembly 400 allows for heat transfer to be controlled in either direction through the active insulated assembly 400. In addition, by adding just the energy required (temperature of the heat transfer medium to be between the external and internal temperatures), the overall energy consumption of the active insulated assembly 400 is reduced. Further, smart materials can be used to allow for self-regulated control of the active insulated assembly 400. Moreover, self-regulated control within the active insulated assembly 400 using the temperature and resulting conductive and/or pressure effects on the layer material (e.g., the active insulated assembly 400 can be used to transfer heat from a higher temperature area to a lower temperature creating a more uniform environment and can do so using pressure imbalances created by the temperature differences). Also, insulation layers could be engineered to be thinner in profile than traditional insulation methods and achieve better performance, modifying or reducing overall construction costs. In addition, the active insulated assembly 400 reduces issues of condensation at or near the surface temperature of the assembly. Further, the active insulated assembly 400 could be designed and operated in such a way as to purge any biological growth without the need for disassembly. The active insulated assembly 400 can be used with more than two surfaces with variable and different thermal collective, redirection, and apparatuses. This converted energy can be used to actively improve the insulating properties of the insulated assembly. Also, the active insulated assembly 400 can use active methods to reduce the overall energy required to maintain a thermal barrier in comparison to traditional passive insulated assemblies. Active methods as include the following processes: 1) the core layer acts as a heat sink to wick away heat before it has a chance to pass through the assembly, or 2) as a heat source to match the higher temperature to stop the migration of heat through the assembly. In both cases, heat is added or removed in incrementally small amounts as close to the temperature needed to maintain neutral heat transfer through the assembly and reduce overall energy consumption. Moreover, the methods of heat transfer and storage using proper installation of the active insulated assembly 400 will reduce heating and/or cooling loads in traditional construction projects. Finally, insulation layers could be engineered to be thinner in profile than traditional insulation methods and achieve better performance, modifying or reducing overall construction costs.

FIG. 4 shows that the active insulated assembly 400 can include a radiant barrier 402 applied to both exposed surfaces. Depending on the temperature range and/or thermal performance requirements, the radiant barrier 402 could be any type of material known to reflect, resist, or block the transfer of radiant energy. For example, the radiant barrier could be composed of any of the following materials: crystalline structures; ceramic structures; conductive metals or alloys—stacked in series or parallel arrangements; tubes, pipes, or wires; gases, fluids, or solid chemical compounds; paints or finishes; plastic, polymer, synthetic, foil sheets, coating, or sheathing; or engineered smart materials. As used herein a radiant barrier 402 shall be any material with a thermal conductivity of less than 1 W/(m*K) (watts per meter kelvin).

FIG. 4 also shows that the active insulated assembly 400 can include a thermal conductor 401 that actively adds or removes energy from the active insulated assembly 400. The thermal conductor 401 can be sandwiched between the radiant barriers 402. Depending on the temperature range and/or thermal performance requirements, the thermal conductor 401 could range from several millimeters in thickness to several meters. As a result of resisting or blocking the radiant energy, the radiant barrier 402 could convert or transfer this energy to the thermal conductor 401. Depending on the temperature range and/or thermal performance requirements, the thermal conductor 401 could be composed of any material or combination of materials known to transfer or convert heat energy. For example, the thermal conductor 401 can include: crystalline structures—both conductive and semi-conductive; ceramic structures—both conductive and semi-conductive; conductive metals or alloys—stacked in series or parallel arrangements; tubes, pipes, or wires; gases, fluids, or solid chemical compounds; engineered smart materials or any other desired material. As used herein a thermal conductor 401 shall be any material with a thermal conductivity of greater than 1 W/(m*K).

One of skill in the art will appreciate that the radiant barrier 402 and the thermal conductor 401 could be composed of the same materials but with different thermal conductivities. For example, ceramic structures could be engineered to be good radiant barriers 402 as well as designed to be good thermal conductor 401. Depending on the temperature range and/or thermal performance requirements, a complete active insulated assembly 400 could be constructed of multiple sub-assembly layers in series, each with varying individual thermal performance. I.e., an active insulated assembly 400 could be radiant barrier 402->thermal conductor 401->radiant barrier 402->thermal conductor 401->radiant barrier 402 or can include active insulated assemblies 400 in series (e.g., radiant barrier 402->thermal conductor 401->radiant barrier 402->open space->radiant barrier 402->thermal conductor 401->radiant barrier 402).

In addition, the active insulated assembly 400 could be externally controlled or self-regulated. For example, sensors embedded behind each radiant layer or incorporated into the material layer itself could be used to measure the resulting non-radiant heat transfer at each exposure and determine the amount and direction of active heat transfer that is applied to the thermal conductor 401. Self-regulated control could be accomplished using materials within each layer known to change conductivity or radiant reflectivity, based on temperature.

One of skill in the art will appreciate that the active insulated assembly 400 can also include a humidity control within the assembly to reduce biological growth (e.g., fungi or bacteria) within the active insulated assembly 400 without the need for disassembly. By adding or removing heat from the assembly, you can actively move the vapor condensing temperature to the outside barrier of the assembly to reduce possible condensation and the resulting microbial growth. I.e., in cases where the assembly will be subjected to high moisture environments on both sides of the assembly, a humidity control could be added to measure humidity on both sides and within the assembly, and using a logic circuit, determine the best active method to reduce moisture migration and insulated assembly degradation. For example, the humidity control can include heating, cooling, dehumidifier or air circulation within the active insulated assembly 400.

Active Insulated Wall Assembly

Figure 5:
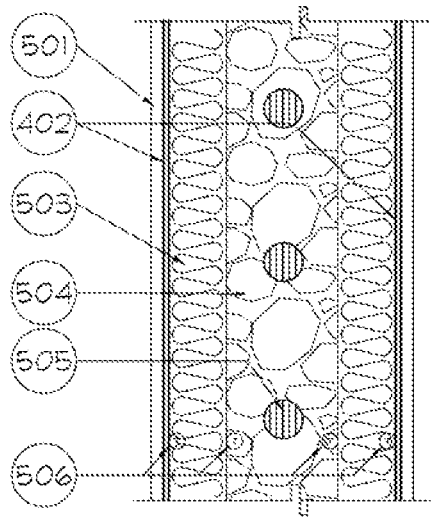
FIG. 5 illustrates an example of an active insulated wall assembly.

FIG. 5 illustrates an example of an active insulated wall assembly 500. The active insulated wall assembly 500 can be used for building walls, although the same concept can be applied to floors or roofs. In addition to the benefits of the active insulated assembly 400 of FIG. 4, the heat collected within the conductive material can be transferred to areas of the active insulated wall assembly 500 not exposed to heat loads to provide a uniform temperature within the conductive layer. Further, fluid circulated as the heat transfer medium can provide both heating and cooling methods depending on the enclosed environmental needs. Also, heat gained from solar panels, waste heat from process loads, or ventilation heat recovery systems can generate fluid temperatures adequate to maintain wall temperatures; reducing the need for fossil fuels. Moreover, because of the approach temperature of the conductive assembly and ambient temperature, cooling sources such as evaporative cooled fluids, ground water, solar panels, and surface water sources are adequate to maintain the wall heat transfer neutral condition reducing the need for electrically driven mechanical cooling. In addition, using the mass of the wall for heating/cooling storage similar to the Trombe wall effect, but allowing the mass of the entire structure to be used for storage. Because a radiant barrier exists on each side of the thermally conductive material, the walls can be heated or cooled during off hours. Additionally or alternatively, the mass of the active insulated wall assembly 500 can be managed to facilitate or hamper heat transfer across the active insulated wall assembly 500 depending on conditions. For example, water can be added or removed to the active insulated wall assembly 500 to control the rate of heat transfer. Further, the ability to modify or delay the normal cooling and heating loads can allow for participation in off peak load demand response.

While implementations described above are primarily descriptive of assemblies and methods currently used, it is understood that the invention is to apply to new materials and processes that have the same effect. For example, one of skill in the art will appreciate that materials that can be manufactured and used in current assemblies that can have either passive multi layered radiant heat redirection or effective improvements in energy or thermal efficiency and performance. In addition, materials or subassemblies that have active means for changing or redirecting radiant heat to improve energy or thermal efficiency and performance are contemplated herein.

In addition, one of sill in the art will appreciate that prefabricated assemblies, post assembled constructions, modified applications or any remodeled instances where secondary radiant heat loss or semi-conductive heat transfer and isolation is contemplated herein. Such embodiments could include layers of engineered paint, plastics, air and foam applied to existing structures that improve thermal and energy performance by capturing, reflecting or redirecting radiant heat.

FIG. 5 shows that the active insulated wall assembly 500 can include PEX (cross-linked polyethylene) piping 505 routed horizontally or vertically. Benefits of using PEX piping 505 include: flexibility; direct routing of pipes; and no corrosion. Fluid circulated within the PEX piping 505 channels is routed around the perimeter of the structure.

FIG. 5 also shows that the active insulated wall assembly 500 can include a semi conductive building material 504. The building material 504 can include any material used in building construction. For example, the building material 504 can include a concrete foundation or wall. The PEX piping 505 can be routed through the building material 504 to facilitate heat capture/transfer.

FIG. 5 further shows that the active insulated wall assembly 500 can include layers of foam insulation 503 with a radiant barrier 402 at each exposure. The foam insulation 503 can be applied to the outer surface of the building material 504. For example, the foam insulation 503 can include expanded polystyrene (EPS) of a density and thickness with bracing and support to be suitable for concrete form work.

FIG. 5 additionally shows that the active insulated wall assembly 500 can include thermal sensors 506. The thermal sensors 506 can be located at the interface of the insulation 503 and the semi conductive layer, at the inside and outside surface for each building exposure. Readings from the thermal sensors 506, using fuzzy logic or any other type of control method that can determine the temperature state of the inside and outside wall assembly, can be compared to the space temperature to determine whether the wall needs heating or cooling. Heat transfer within the semi conductive layer, using various methods, includes using the pex piping 505 (or other thermal conductor) to add or remove heat as necessary to maintain negligible heat transfer through the active insulated wall assembly 500.

Additionally or alternatively, the active insulated wall assembly 500 can communicate with other active insulated wall assemblies to increase effectiveness. For example, a southern active insulated wall assembly 500 which is exposed to the sun (and, therefore, hotter than the interior space) may communicate with a northern active insulated wall assembly 500 which is shaded by the building (and, therefore, cooler than the interior space) and transfer heat from the southern active insulated wall assembly 500 to the northern active insulated wall assembly 500, bringing both closer to the interior temperature, increasing the effectiveness of climate controls within the interior space.

Likewise, thermal energy can be moved using energy obtained from any desired source. For example, thermal energy can be obtained or removed using solar hydronic, solar PV, geothermal techniques, evaporative methods or any other desired source. Additionally or alternatively, the energy for moving thermal energy within the pex piping 505 (or other thermal conductor) can come from any desired source. For example, if the pex piping 505 (or other thermal conductor) has a fluid, the fluid can be moved from one active insulated wall assembly 500 to another active insulated wall assembly 500 using a fan, pump or other electromechanical device. Additionally or alternatively, if the pex piping 505 (or other thermal conductor) includes electrical components to move thermal energy, then the electrical power can come directly from any of the above sources to the electrical components, rather than to an intervening mechanical device.

Additionally or alternatively, the movement of thermal energy can be controlled by a logic device. A logic device can include any device capable of performing logic functions. For example, the logic device can perform Boolean logic or can produce a pre-determined output based on input. The logic device can include ROM memory, programmable logic device (PLD), programmable array logic (PAL), generic array logic (GAL), complex programmable logic device (CPLD), field programmable gate arrays (FPGA), logic gates, processors or any other device capable of performing logic functions.

The logic device can be configured to control the movement of thermal energy within the pex piping 505 (or other thermal conductor). For example, the logic device can decide to use the thermal mass or storage available within the overall system to, to control the rate of thermal transfer through the active insulated wall assembly 500. Additionally or alternatively, the logic device can cause the pex piping 505 (or other thermal conductor) to move thermal energy from one location to another (e.g., from a first active insulated wall assembly 500 to a second active insulated wall assembly 500 or from a location which is warmer, such as a server room, to where it is needed, such as an office space being heated. Additionally or alternatively, the logic device can use other methods to control the rate of thermal transfer through the active insulated wall assembly 500. For example, the logic device can cause the pex piping 505 (or other thermal conductor) to expand or contract to allow for greater or lesser thermal conductivity or can change the voltage potential or other characteristic of the thermal conductor to change the thermal conductivity.

Figure 6:
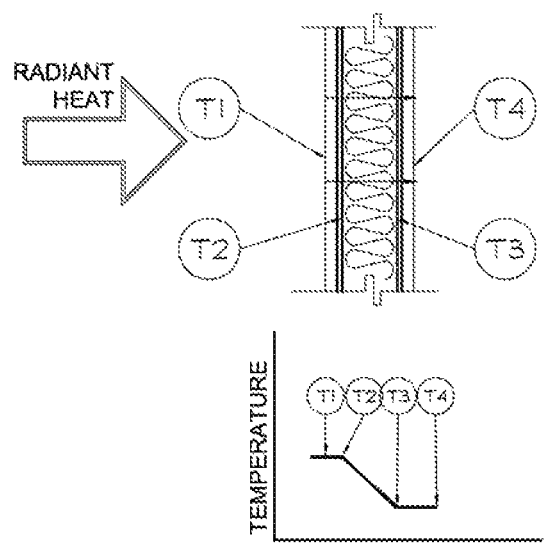
FIG. 6 illustrates a temperature profile over time of the active insulated wall assembly in a non-active mode.

FIG. 6 illustrates a temperature profile over time of the outer wall (T1), temperature readings for a thermal sensor inside the outer radiant barrier (T2) temperature readings for a thermal sensor inside the inner radiant barrier (T3) and the inner wall (T4) of the active insulated wall assembly in a non-active mode. In a normal daily cycle thermal gradients are set between the inside and outside and this denotes the driving force in heat transfer through the assembly. The insulation layer, depending on its R-value will resist the flow of heat and, at steady state, a thermal gradient will be established as indicated in the related thermal graph. Note that heat does pass through the wall as described by the equation: $Q=UA\Delta T$, where Q is heat transferred, U is 1/the summation of all individual R values, A is the assembly area, and $\Delta T$ is the temperature difference across the assembly.

Figure 7:
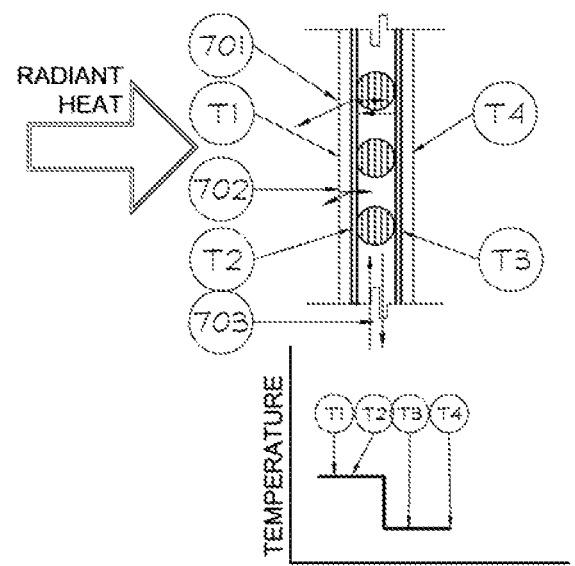
FIG. 7 illustrates a temperature profile over time of the active insulated wall assembly in an active mode.

FIG. 7 illustrates a temperature profile over time of the outer wall (T1), temperature readings for a thermal sensor inside the outer radiant barrier (T2) temperature readings for a thermal sensor inside the inner radiant barrier (T3) and the inner wall (T4) of the active insulated wall assembly in an active mode. Relative to the graph of FIG. 6, the radiant barriers maintain a much steadier temperature, allowing for less energy input to create a stable environment inside the structure.

Figure 8:
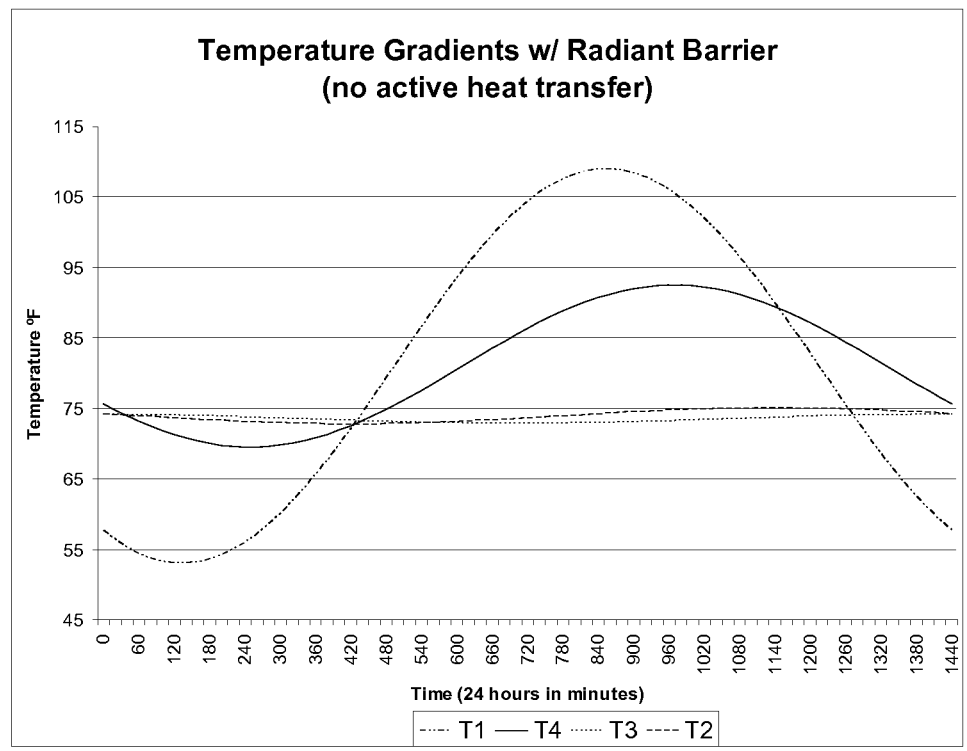
FIG. 8 illustrates a temperature gradient across a typical insulated assembly.

FIG. 8 illustrates a temperature gradient across a typical insulated assembly (i.e., not active). In a typical insulated assembly, radiant energy is exposed to the exterior surface of the assembly, heating the surface and creating both conductive and radiant heat transfer through the assembly. Once the heat passes through the insulated assembly, it must be dealt with using other more costly methods to address the resulting heat transfer as it is well understood that electrically driven air conditioning or fossil fuel furnaces expend much higher levels of energy to condition the space. By actively addressing the heat transfer at the assembly, the overall energy expended to maintain the conditioned space is reduced.

Figure 9:
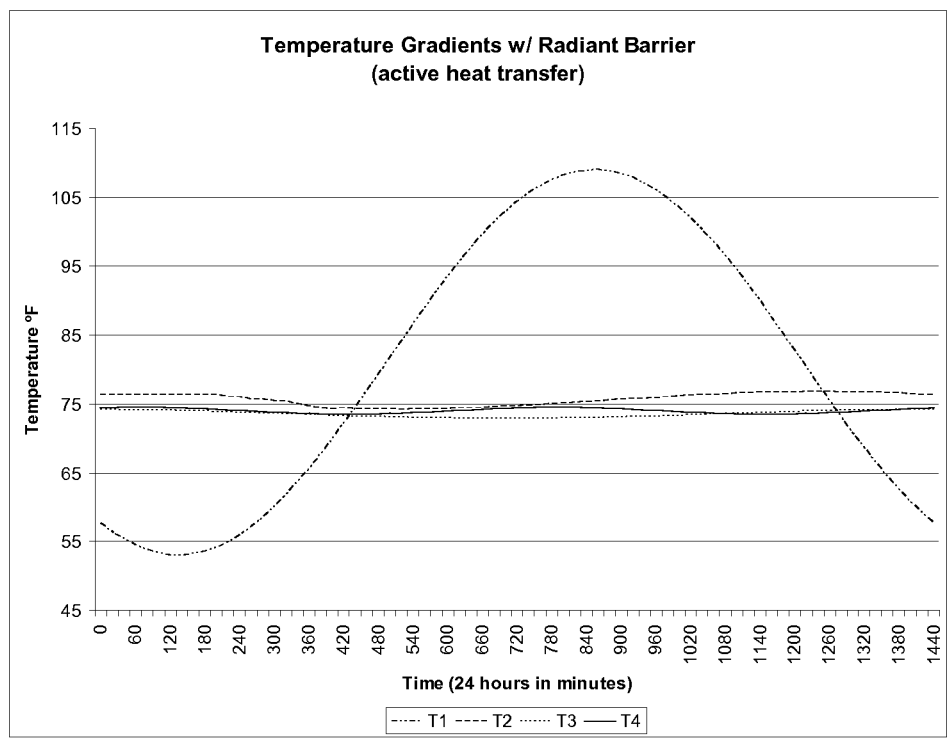
FIG. 9 illustrates a temperature gradient across an active insulated assembly.

FIG. 9 illustrates a temperature gradient across an active insulated assembly represented by FIG. 7. Radiant energy is exposed to the assembly's exterior surface, which is absorbed and heats the finish layer (701). The finish layer then begins to radiate energy at its resulting temperature until it reaches the radiant barrier, where a major portion of the radiant heat is reflected back and a small portion heats the radiant barrier (702). The radiant barrier then transfers energy in the form of radiation and conduction to the thermally conductive layer of the assembly. The resultant radiant energy emitted by the first radiant layer, at a low temperature is now reflected back by the second radiant layer, trapping this energy between the two radiant barriers. Because the assembly is symmetrical in construction and can resist heat transfer in either direction providing dual duty performance, depending on the application of the assembly. The reflection of radiant energy at the second radiant barrier back into the conditioned environment means the inside layer temperature is closer to the conditioned space temperature, which may in some modes of operation, allow less energy to be used to maintain the conditioned space at optimal temperatures. With heat transfer through the assembly limited to conduction, the core layer of the assembly uses means and methods to add or remove energy 703 to resist the overall heat transfer through the assembly.

FIG. 9 shows that there is a lag in time between the highest outdoor temperature and the resulting rise in temperature in the conductive core layer. This allows for predictive preconditioning within the assembly to apply active methods to remove heat or store heat in anticipation of heat transfer loads. Application of active methods could be planned around demand response or favorable utility rates or environmental conditions as the load can be addressed at some point before it reaches the conditioned space.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An active insulated assembly for controlling heat transfer, the active insulated assembly comprising:
    a first radiant barrier on a first side of the active insulated assembly, the first radiant barrier having a first radiant reflectivity characteristic and the first radiant barrier being configured to reflect radiant energy incident thereon in a direction toward a source of the incident radiant energy;
    a first thermal sensor configured to measure a temperature of the first radiant barrier;
    a second radiant barrier on a second side of the active insulated assembly wherein the second side is opposite the first side, the second radiant barrier having a second radiant reflectivity characteristic and the second radiant barrier being configured to reflect radiant energy incident thereon in a direction toward a source of the incident radiant energy;
    a second thermal sensor configured to measure a temperature of the second radiant barrier;
    a thermal conductor in thermal communication with the first and second radiant barriers; and
    a logic device coupled to one or both of the first and second thermal sensors and configured to:
        anticipate a heat transfer load of the active insulated assembly based upon the temperature readings provided thereto; and
        based upon the anticipated heat transfer load, adjusting a temperature of one or both of the first and second radiant barriers by adding or removing thermal energy from the first and second barriers via the thermal conductor.

2. The active insulated assembly of claim 1, wherein the thermal conductor moves thermal energy using at least one of:
    solar hydronic;
    solar PV;
    geothermal; or
    evaporative methods.

3. The active insulated assembly of claim 2, wherein the movement of thermal energy in thermal conductor is controlled by the logic device.

4. The active insulated assembly of claim 3, wherein the logic device includes a processor.

5. The active insulated assembly of claim 1, wherein the thermal conductor moves thermal energy to a second active insulated assembly.

6. The active insulated assembly of claim 1, wherein the thermal conductor moves thermal energy to a space where the thermal energy is used to warm the space.

7. The active insulated assembly of claim 1, wherein the thermal conductor moves thermal energy from a space where the removal of thermal energy is used to cool the space.

8. The active insulated assembly of claim 1, wherein each of the first radiant barrier and the second radiant barrier includes at least one of:
crystalline structures;
ceramic structures;
metal;
tubes;
pipes;
wires;
chemical compounds;
paints;
finishes;
plastic;
polymer;
synthetic;
foil sheets;
coating;
sheathing; or
engineered smart materials.

9. The active insulated assembly of claim 1, wherein the thermal conductor includes at least one of:
crystalline structures;
ceramic structures;
metals;
tubes;
pipes;
wires;
chemical compounds; or
engineered smart materials.

10. The active insulated assembly of claim 1 further comprising a third sensor configured to measure:
the temperature within the active insulated assembly; or
the non-radiant heat transfer at the first radiant barrier.

11. The active insulated assembly of claim 1 further comprising a humidity control.

12. An active insulated assembly for controlling heat transfer, the active insulated assembly comprising:
a first radiant barrier configured to reflect radiant energy back to its source, the first radiant barrier applied to a first surface of the active assembly;
a second radiant barrier applied to a second surface of the active assembly opposite the first radiant barrier and the first surface, the second radiant barrier configured to reflect radiant energy back to its source;
a thermal conductor in thermal communication with the first radiant barrier and the second radiant barrier, the thermal conductor configured to condition thermal energy within the active insulated assembly by adding to removing thermal energy to neutralize net heat transfer;
a plurality of sensor arranged within and without the active insulated assembly, each sensor configured to obtain temperature readings associated with a location of the active insulated assembly based on a position of each sensor, wherein a placement of each sensor with respect to each other sensor enables a determination of heat transfer within and without the active insulated assembly;
a logic device configured to anticipate a heat transfer load of the active insulated assembly based on the temperature readings from the plurality of sensors; and
the logic device further configured to control the thermal conductor to add or remove heat within the active insulated assembly as a function of the anticipated heat transfer load; and
wherein the thermal conductor is configured to add and remove heat, the thermal conductor configured as a heat sink to remove heat before it is able to pass through the active insulated assembly.

13. The active insulated assembly of claim 12, wherein the thermal conductor includes piping containing a fluid.

14. The active insulated assembly of claim 13, wherein the mass of the fluid in the piping can be controlled by the logic device.

15. The active insulated assembly of claim 13, wherein the fluid includes at least one of:
air; or
water.

16. The active insulated assembly of claim 14 further comprising a storage tank configured to store the fluid when not in the piping.

17. The active insulated assembly of claim 14 further comprising a pump configured to move the fluid within the piping.

18. The active insulated assembly of claim 12 wherein the logic device is configured to engage in predictive preconditioning, wherein predictive preconditioning includes at least one of:
moving thermal energy in anticipation of external environmental changes; or
planning the movement of thermal energy based on utility usage.

* * * * *